US012644745B2

(12) United States Patent
Zhu et al.

(10) Patent No.: US 12,644,745 B2
(45) Date of Patent: Jun. 2, 2026

(54) METHOD FOR OPERATING A CORIOLIS MASS FLOWMETER

(71) Applicant: Endress+Hauser Flowtec AG, Reinach (CH)

(72) Inventors: Hao Zhu, Freising (DE); Johan Pohl, Freiburg (DE); Alfred Rieder, Landshut (DE)

(73) Assignee: Endress+Hauser Flowtec AG, Reinach (CH)

( * ) Notice: Subject to any disclaimer, the term of this patent is extended or adjusted under 35 U.S.C. 154(b) by 321 days.

(21) Appl. No.: 18/290,957

(22) PCT Filed: Jul. 4, 2022

(86) PCT No.: PCT/EP2022/068450
§ 371 (c)(1),
(2) Date: Jan. 22, 2024

(87) PCT Pub. No.: WO2023/001534
PCT Pub. Date: Jan. 26, 2023

(65) Prior Publication Data
US 2024/0344869 A1      Oct. 17, 2024

(30) Foreign Application Priority Data

Jul. 22, 2021     (DE) ..................... 10 2021 118 961.6

(51) Int. Cl.
G01F 1/84          (2006.01)
(52) U.S. Cl.
CPC .......... G01F 1/8431 (2013.01); G01F 1/8422 (2013.01); G01F 1/8427 (2013.01); G01F 1/8477 (2013.01)

(58) Field of Classification Search
CPC .... G01F 1/8422; G01F 1/8431; G01F 1/8436; G01F 1/8463
See application file for complete search history.

(56) References Cited

U.S. PATENT DOCUMENTS

| | | |
|---|---|---|
| 4,680,974 A | 7/1987 | Simonsen et al. |
| 4,823,614 A | 4/1989 | Dahlin |
| (Continued) | | |

FOREIGN PATENT DOCUMENTS

| | | |
|---|---|---|
| DE | 102007008197 A1 | 9/2007 |
| DE | 102007061585 A1 | 6/2008 |
| (Continued) | | |

*Primary Examiner* — Erika J. Villaluna
(74) *Attorney, Agent, or Firm* — Kelly J. Smith; Endress+Hauser (USA) Holding, Inc.

(57) ABSTRACT

A method for operating a Coriolis mass flowmeter having at least one vibratable measuring tube for conducting a medium includes exciting a first symmetrical bending vibration mode of the at least one measuring tube, and exciting a second symmetrical bending vibration mode of the at least one measuring tube. A first mass flow rate measurement value is determined on the basis of a first Coriolis deformation of the at least one measuring tube and a first stored mode-specific zero point error value. A second mass flow rate measurement value is determined on the basis of a second Coriolis deformation of the at least one measuring tube and a second stored mode-specific zero point error value. A zero point deviation value of the mass flow rate measurement is determined as a function of a deviation between the first mass flow rate measurement value and the second mass flow rate measurement value.

8 Claims, 3 Drawing Sheets

(56)                    References Cited

U.S. PATENT DOCUMENTS

| | | | | |
|---|---|---|---|---|
| 7,966,895 B2 * | 6/2011 | Kuttler | .................... | G01F 1/849 |
| | | | | 73/861.356 |
| 12,449,292 B2 * | 10/2025 | Zhu | ....................... | G01F 1/8422 |
| 2019/0162702 A1 | 5/2019 | Rieder et al. | | |
| 2024/0027249 A1 * | 1/2024 | Zhu | ....................... | G01F 1/8422 |

FOREIGN PATENT DOCUMENTS

| | | | |
|---|---|---|---|
| DE | 102009012474 A1 | 9/2010 | |
| EP | 0261435 B1 | 10/1991 | |
| EP | 1055102 B1 | 3/2003 | |
| EP | 3394575 B1 | 5/2021 | |
| WO | 2019045703 A1 | 3/2019 | |

* cited by examiner

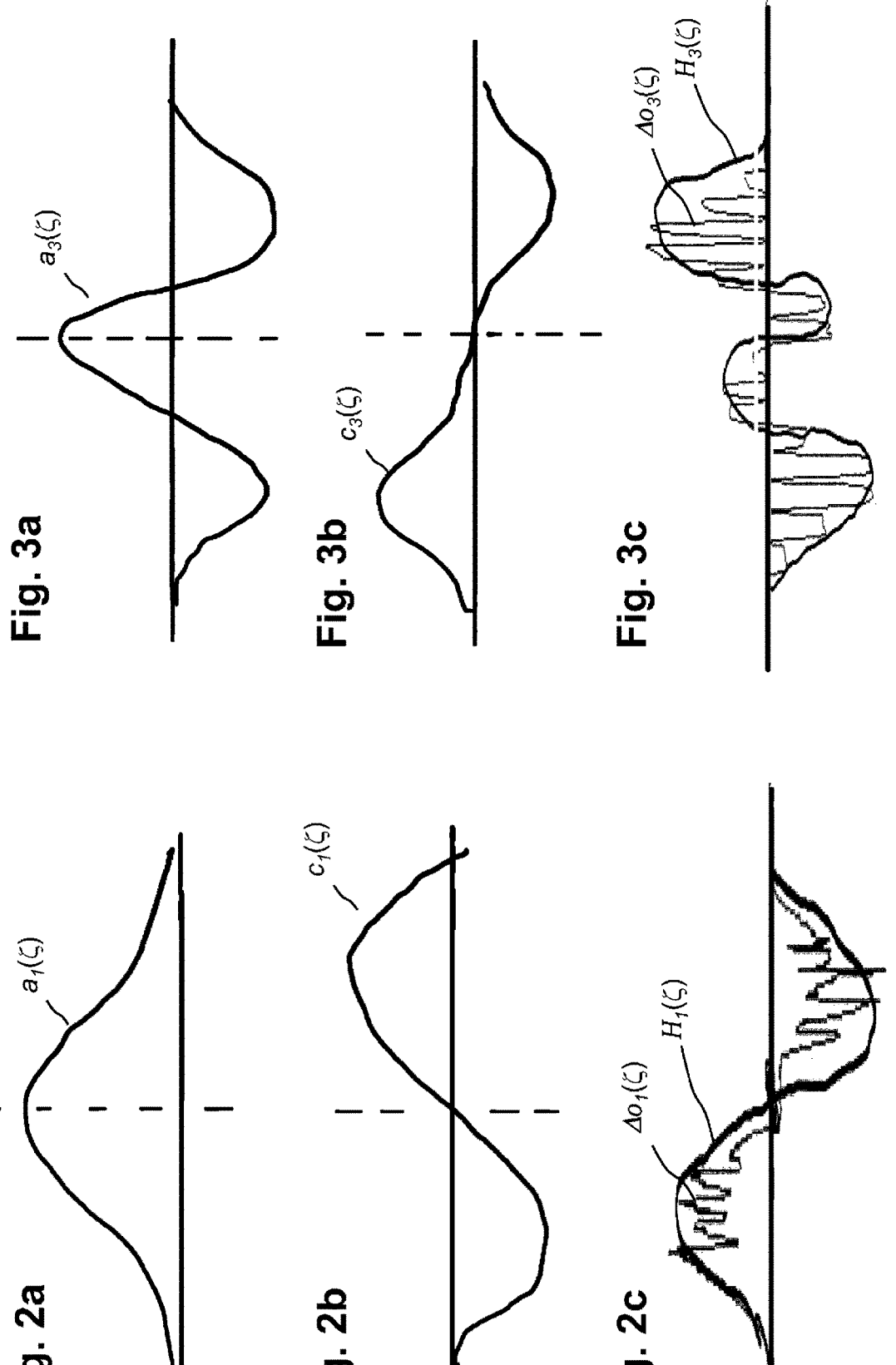

METHOD FOR OPERATING A CORIOLIS MASS FLOWMETER

CROSS-REFERENCE TO RELATED APPLICATIONS

The present application is related to and claims the priority benefit of DPMA Patent Application No. 10 2021 118 961.6, filed on Jul. 22, 2021 and International Patent Application No. PCT/EP2022/068450, filed on Jul. 4, 2022, the entire contents of which are incorporated herein by reference.

TECHNICAL FIELD

The present invention relates to a method for operating a Coriolis mass flowmeter having at least one vibratable measuring tube for conducting a medium.

BACKGROUND

During operation of any measuring device, measurement errors can occur, including in the case of a Coriolis mass flowmeter, wherein in principle a distinction is made between a zero point error and a span error. Zero point errors arise in particular due to asymmetries in the vibration behavior of the measuring tube.

The international publication WO 2019/045703 A1 describes that the stiffness of a measuring tube can change over time, for example, due to abrasion or corrosion, wherein the zero point error does not change. Measurement errors due to changed measuring tube stiffness can be identified, for example, on the basis of the ratio of the excitation signal to the sensor signal.

In contrast, asymmetries that change the zero point can be caused, for example, by inhomogeneous attenuations and are not accessible to detection with the operating methods described so far. Of course, in the case of a factory calibration, the corresponding zero point error can be determined for the vibration modes under consideration in a stationary medium, i.e., a flow rate of zero, and can be subtracted accordingly when calculating the flow measurement values. However, during ongoing measuring operation, it cannot be detected with the previous monitoring methods whether the zero point error has changed compared to the state at the factory calibration. This would therefore lead to undetected measurement errors during the measurement operation when determining the mass flow rate.

SUMMARY

It is therefore the object of the present invention to provide a remedy here, and to specify an operating method that promptly detects a changing zero point. The object is achieved by the method according to the present disclosure.

The method according to the invention for operating a Coriolis mass flowmeter having at least one vibratable measuring tube for conducting a medium comprises:

Exciting a first symmetrical bending vibration mode of the at least one measuring tube;

Exciting a second symmetrical bending vibration mode of the at least one measuring tube;

Determining a first mass flow rate measurement value on the basis of a first Coriolis deformation of the at least one measuring tube of a first stored mode-specific zero point error value;

Determining a second mass flow rate measurement value on the basis of a second Coriolis deformation of the at least one measuring tube of a second stored mode-specific zero point error value; and Determining a zero point deviation value of the mass flow rate measurement as a function of a deviation between the first mass flow rate measurement value and the second mass flow rate measurement value.

The first Coriolis deformation results from the inertial forces of the flowing medium in response to the vibration of the measuring tube in the first symmetrical bending vibration mode. The second Coriolis deformation results from the inertial forces of the flowing medium in response to the vibration of the measuring tube in the second symmetrical bending vibration mode.

Since the zero point error is not readily accessible during ongoing measurement operation, a deviation value between the first mass flow rate measurement value and the second mass flow rate measurement value is determined here, and this deviation value is interpreted as a zero point deviation value, i.e., as a deviation between the temporal changes of the zero point error of the first or second mass flow rate measurement value.

In one development of the invention, the method further comprises monitoring the zero point deviation value and signaling an error status if the at least one zero point deviation value exceeds a threshold value.

In this case, the invention proceeds from the idea that large zero point deviation values require sufficient changes in the zero point errors of the mass flow rate measurement values under consideration. In this respect, the method according to the invention indicates the zero point deviation value as an indication of zero point errors. However, if the zero point errors of the mass flow rate measurement values under consideration developed identically, the method according to the invention would fail since no variable zero point deviation value would then be detectable. However, this is a very theoretical concern, since a uniform development of the zero point errors is very unlikely. As already mentioned at the outset, zero point errors are the consequence of asymmetries in the vibration behavior of the measuring tube, which in particular occur due to asymmetrically distributed local attenuations, for example, due to build-up and/or micro-abrasion. However, these local attenuations have different effects on the relevant vibration modes, since the distribution of the vibration energy to be influenced by the local attenuations is very different along the measuring tube between the vibration modes under consideration.

In one development of the invention, the determination of the first mass flow rate measurement value and the second mass flow rate measurement value in each case comprises: determining in each case a preliminary mass flow rate measurement value on the basis of the corresponding Coriolis deformation of the at least one measuring tube; determining in each case a correction factor for the first and second preliminary mass flow rate measurement values for influencing the mass flowmeter by means of a resonator effect due to a gas loading of the medium conducted in the measuring tube; and correcting the two preliminary mass flow rate measurement values with the corresponding mass flow rate correction factor.

In one development of the invention, the method further comprises: checking on the basis of the natural frequencies of a plurality of bending vibration modes whether an influencing of the mass flowmeter by means of a resonator effect due to a gas loading of the medium conducted in the measuring tube is present; wherein, in this case, the determination of the first mass flow rate measurement value and the second mass flow rate measurement value comprises in each case: determining in each case a preliminary mass flow rate measurement value on the basis of the corresponding Coriolis deformation of the at least one measuring tube; determining in each case a correction factor for the first and second preliminary mass flow rate measurement values for influencing the mass flowmeter by means of a resonator effect due to a gas loading of the medium conducted in the measuring tube; and correcting the two preliminary mass flow rate measurement values with the corresponding mass flow rate correction factor.

In one development of the invention, the method is carried out in a stationary medium, wherein the method further comprises:

Updating the first zero point error value on the basis of the first mass flow rate measurement value; and Updating the second zero point error value on the basis of the second mass flow rate measurement value.

In one development, the method further comprises: correcting the first and second mass flow rate measurement values with regard to the influence of at least one of the following influencing variables, before determining the zero point deviation value: media pressure, media temperature, and Reynolds number. These corrections ensure that influencing variables that affect the different bending vibration modes differently do not cause any falsification of the zero point deviation value.

The Coriolis mass flowmeter according to the invention comprises: at least one measuring tube for conducting a medium; at least one exciter for exciting bending vibration modes of the at least one measuring tube; at least one sensor for detecting bending vibrations of the at least one measuring tube; a measuring and operation circuit configured to drive the exciter, to detect signals of the at least one sensor, to determine a mass flow rate measurement value on the basis of the signals of the at least one sensor, and to carry out the method according to any of claims 1 to 7.

BRIEF DESCRIPTION OF THE DRAWINGS

The present disclosure is now explained in more detail on the basis of the exemplary embodiment shown in the figures. In the figures:

FIG. 1b shows a spatial representation of the exemplary embodiment of the Coriolis mass flowmeter according to the present disclosure from FIG. 1a;

FIG. 2a shows a schematic representation of the bending line of the first symmetrical bending vibration mode;

FIG. 2b shows a schematic representation of the Coriolis deformation due to the mass flow and the measuring tube vibrations in the first symmetrical bending vibration mode;

FIG. 2c shows a schematic representation of the influence of local attenuations on the flow measurement on the basis of the first symmetrical bending vibration mode;

FIG. 3a shows a schematic representation of the bending line of the second symmetrical bending vibration mode;

FIG. 3b shows is a schematic representation of the Coriolis deformation due to the mass flow and the measuring tube vibrations in the second symmetrical bending vibration mode;

FIG. 3c shows a schematic representation of the influence of local attenuations on the flow measurement on the basis of the second symmetrical bending vibration mode;

DETAILED DESCRIPTION

Figure 1B:
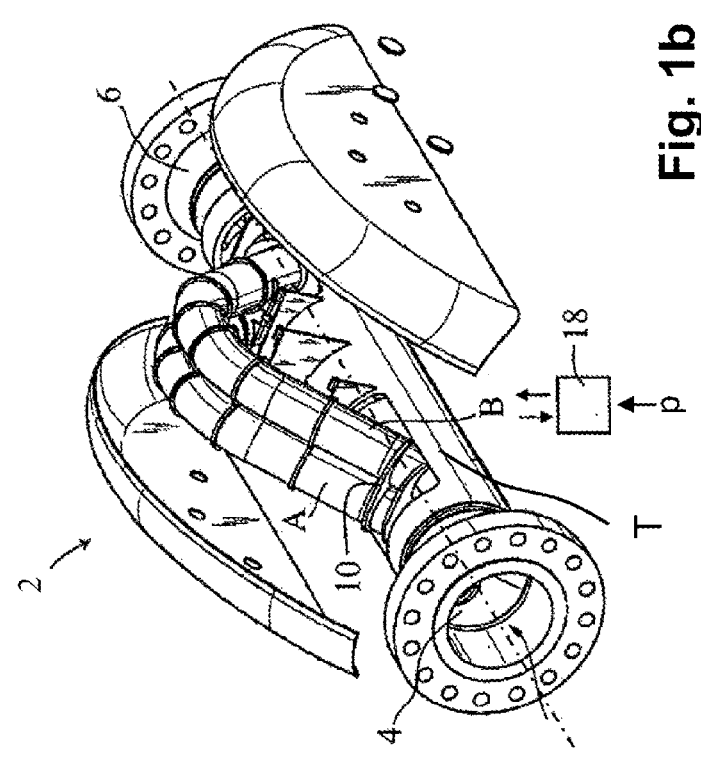
Figure 1A:
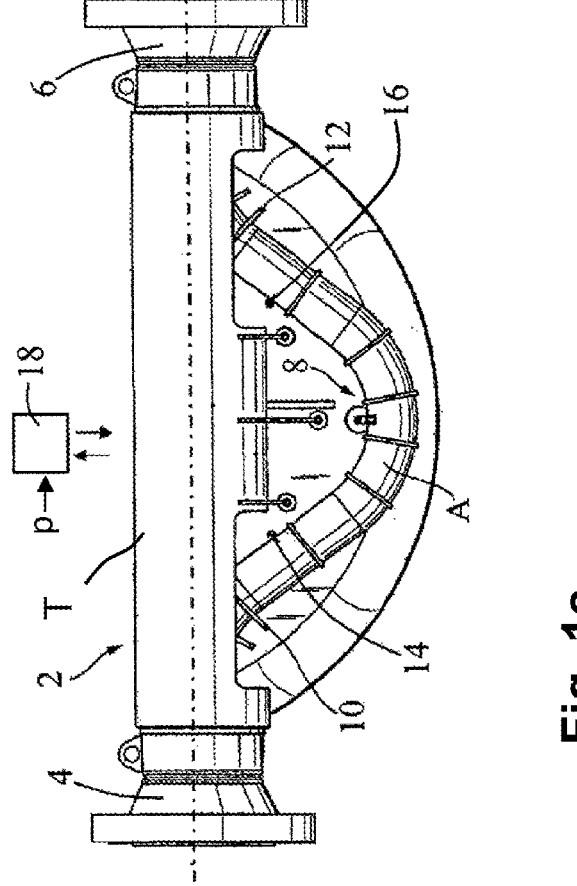
FIG. 1a shows a side view of an exemplary embodiment of a Coriolis mass flowmeter according to the present disclosure for carrying out the method according to the present disclosure.

FIGS. 1a and 1b show an exemplary embodiment of a Coriolis mass flowmeter 2 according to the invention, which is designed to carry out the method according to the invention. The Coriolis mass flowmeter 2 has two vibratably mounted measuring tubes A and B, which each have an arcuate shape and extend in parallel to one another. The Coriolis mass flowmeter 2 can be inserted into a pipe (not shown) in such a way that the fluid flowing in the pipe flows through the two measuring tubes A, B. At the inlet side and at the outlet side, the measuring tubes A, B are each enclosed in flow dividers or collectors 4, 6, the latter being rigidly connected to one another by a support tube T. The inlet-side and outlet-side end portions of the measuring tubes are thus also coupled to the support tube T, whereby relative movements between the inlet-side and outlet-side end portions of the measuring tubes are effectively suppressed.

Arranged between the two measuring tubes A, B is an electrodynamic exciter 8 by means of which the two measuring tubes A, B can be excited to perform bending oscillations with respect to one another, wherein a free oscillation length of the measuring tubes A, B is defined by coupling elements 10, 11, with which the measuring tubes are mechanically coupled on the inlet side and on the outlet side. Between the two measuring tubes A, B, electrodynamic vibration sensors 14, 16 are arranged on an inlet-side portion and on an outlet-side portion. The Coriolis mass flowmeter 2 further comprises an operation and evaluation circuit 18 for feeding the exciter 8 with an exciter current and for detecting and evaluating measurement signals of the electrodynamic vibration sensors 14, 16. The Coriolis mass flowmeter 2 further comprises a first temperature sensor (not shown here), which is arranged, for example, on the first coupling element 10 in order to determine a first temperature measurement value representative of the temperature of the measuring tubes A, B. The positioning of the temperature sensor on the coupling element 10 is appropriate insofar as the coupling element is only connected to the measuring tubes A, B, so that the temperature of the coupling element is largely defined by the temperature of the measuring tubes. Likewise, the temperature sensor can also be arranged on one of the measuring tubes, in particular outside the vibrating portion delimited by the coupling elements, whereby a shorter response time of the temperature sensor is achieved. The measuring and operation circuit 18 is configured to detect measurement signals from the temperature sensor which represent the temperature measurement values which, for example, enter into the calculation of the temperature-dependent modulus of elasticity.

In order to carry out the method according to the invention, it is advantageous if the measuring and operation circuit also has an input for a pressure measurement value p in order to be able to take into account the medium pressure when performing the method according to the invention for operating the Coriolis mass flowmeter.

Although FIGS. 1a and 1b show an exemplary embodiment of a Coriolis mass flowmeter with a pair of measuring tubes curved in the rest position, the invention is equally applicable for Coriolis mass flowmeters with a single measuring tube or with several pairs of measuring tubes. Similarly, instead of the illustrated measuring tubes which are curved in the rest position with a mirror geometry in relation to a measuring tube transverse plane, it is also possible for realizing the invention to use even S-shaped measuring tubes or straight measuring tubes.

The principle on which the invention is based is described below with reference to FIGS. 2a to c and 3a to c. The mass flow measurement on the basis of the Coriolis principle evaluates a deviation of a vibration from its ideal symmetrical shape, wherein the deviation is caused by a superposition of an antisymmetrical Coriolis deformation whose magnitude is proportional to the mass flow. FIGS. 2a and 3a schematically show the bending lines $a_1(\zeta)$, $a_3(\zeta)$ of the first two symmetrical bending vibration modes of a measuring tube along a coordinate $\zeta$ in the longitudinal direction of the measuring tube, wherein FIGS. 2b and 3b each represent the associated Coriolis deformations $c_1(\zeta)$, $c_3(\zeta)$ of the measuring tube, which are each superimposed on the associated bending vibration mode. In the present context, the detailed curve is not crucial. It is only essential that the Coriolis deformations of different modes have their maxima and minima in the longitudinal direction at different positions. Thus, the Coriolis deformations shown have different cross-sensitivities to local attenuations, since a local attenuation at the maximum of a Coriolis deformation obviously has a different influence than a local attenuation at a zero point of the Coriolis deformation. Such local attenuations, which can arise, for example, due to build-up formation and/or micro-abrasion or gas inclusions, act as zero point errors, as shown in FIGS. 2c and 3c. The curves each show an experimentally determined change in the flow measurement value $\Delta o_1(\zeta)$, $\Delta o_3(\zeta)$ for different local attenuations of the first and second symmetrical bending vibration modes as a function of the position $\zeta$ of the attenuation and associated envelope curves H1, H3. The attenuation was effected by applying a damper mass with a contact surface of approximately 1 cm² on the measuring tube. In normal measuring operation, these zero point errors cannot be identified using methods according to the prior art. However, according to the invention, by comparing two mass flow rate measurement values on the basis of different bending vibration modes, it is possible to determine whether a deviation occurs. If other causes can be excluded, this deviation can be assigned to a zero point error.

The sequence of the method according to the invention for zero point monitoring is now explained in more detail with reference to the exemplary embodiment shown in FIG. 4a. The method 100 according to the invention begins with exciting 110a a first symmetrical bending vibration mode and exciting 110b a second symmetrical bending vibration mode of the at least one measuring tube. The two symmetrical bending vibration modes are excited in particular simultaneously.

A first mass flow rate measurement value is determined 120a on the basis of a first Coriolis deformation of the at least one measuring tube and a first stored mode-specific zero point error value, and a second mass flow rate measurement value is determined 120b on the basis of a second Coriolis deformation of the at least one measuring tube and a second stored mode-specific zero point error value. The mass flow rate measurement values $\dot{m}_i$ are each determined by means of a linear function of the mode-specific time delay $\tau_i$ between the speed maximum of two vibration sensors, according to:

$$\dot{m}_i = \mathrm{calf}_i \cdot \tau_i + o_i,$$

wherein $\mathrm{calf}_i$ and $o_i$ describe a mode-specific calibration factor and a mode-specific zero point error, respectively, which, for example, are determined during an initial adjustment and stored in a memory of the measuring and operation circuit.

Ideally, $|\dot{m}_1 - \dot{m}_2| < \varepsilon$ applies for simultaneously collected mass flow rate measurement values on the basis of two different bending vibration modes, wherein $\varepsilon$ is a threshold value for the zero point deviation. In order to check to what extent this condition is met, determining 130 the difference amount $|\dot{m}_1 - \dot{m}_2|$ between the two mass flow rate measurement values and assigning this difference amount to a zero point deviation value and storing the zero point deviation value follows.

This is followed by comparing 140 the zero point deviation value with a threshold value $\varepsilon$, wherein an error is signaled 150 when the zero point deviation value exceeds the threshold value. Otherwise, without this signaling, a new run-through of the method begins. The threshold value can be, for example, 0.1% of the measurement range.

In one development, the temporal development of the zero point deviation value can also be monitored and extrapolated as, for example, a linear function of time, wherein a need for maintenance can then also be signaled if, from the extrapolation, an exceeding of the threshold value is to be expected within a period to be defined of, for example, one month or one week.

Figures 4A, 4B, 4C:
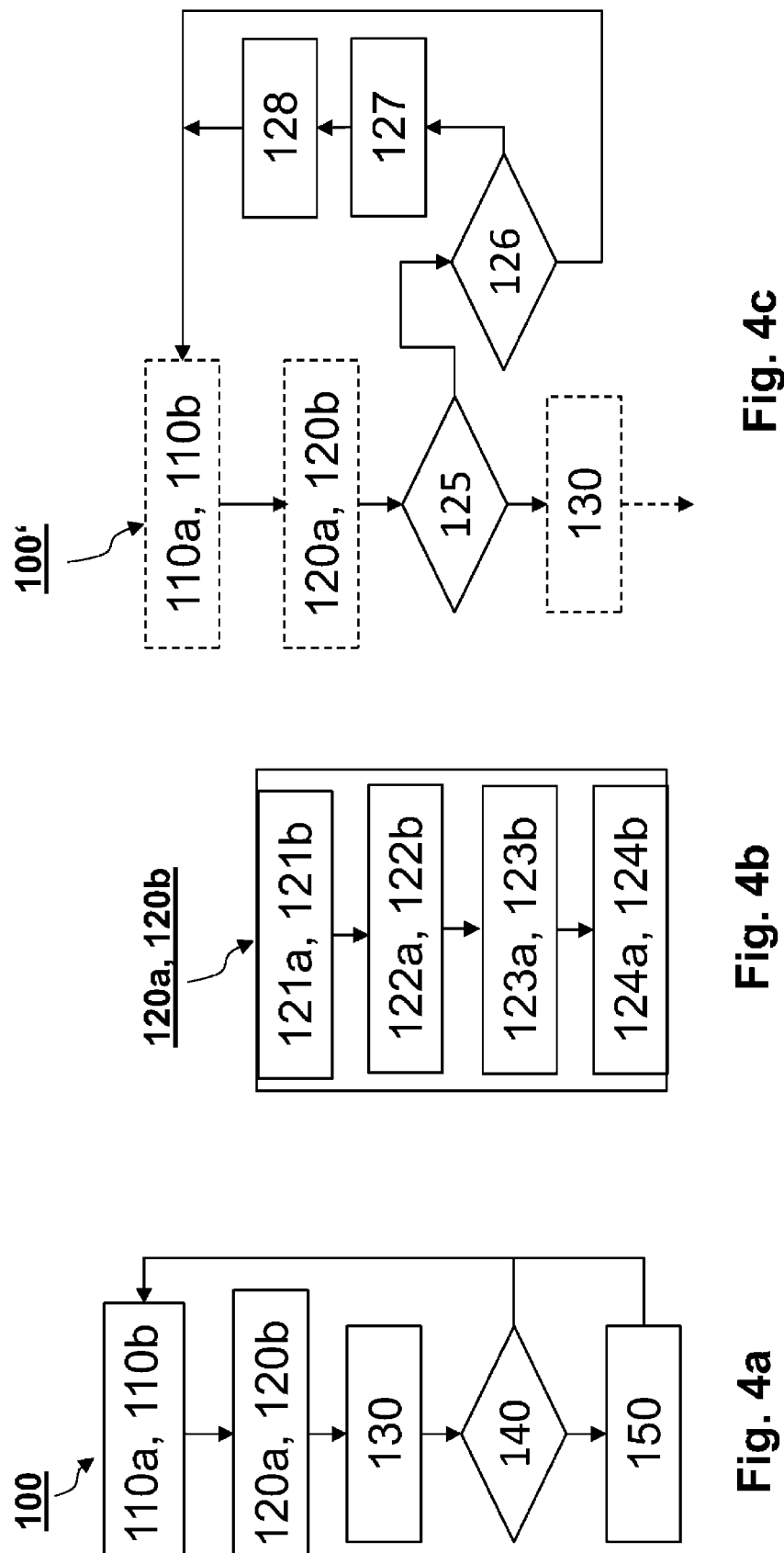
FIG. 4a shows a flowchart of an exemplary embodiment of a method according to the present disclosure for operating a Coriolis mass flowmeter.
FIG. 4b shows a detailed flowchart for a partial step of the exemplary embodiment of the method according to the present disclosure from FIG. 4a, and FIG. 4c shows a flowchart of an exemplary embodiment of a development of the method according to the present disclosure for operating a Coriolis mass flowmeter.

FIG. 4b now shows in detail how the determination 120a, 120b of the mass flow rate measurement values takes place. Insofar as the mode-specific calibration factors $\mathrm{calf}_i$ have mode-specific cross-sensitivity, the influence thereof must initially be corrected before a zero point deviation value can be determined. In a first substep, the mode-specific time delays $\tau_i$ are simultaneously determined 121a, 121b. Subsequently, the mode-specific preliminary calibration factors $\mathrm{calf}_i'$ are calculated 121a, 121b, according to:

$$\mathrm{calf}'_i = \mathrm{calf}_{ref\,i} \Pi_j K_{i,j},$$

wherein $\mathrm{calf}_{ref\,i}$ describes the mode-specific calibration factors under a reference condition, and the $K_{i,j}$ are mode-specific correction factors, which in each case correct one of the influences of density, viscosity, temperature, pressure, and media compressibility.

Details for correcting influences of density, viscosity, temperature and pressure are familiar to the person skilled in the art of flow measuring technology and are described, for example, in EP 0261 435 B1, DE 102007 061 585 A1, DE 102007008 197 A1 and DE 102009012474 A1 and the prior art cited therein.

Details for correcting influences of media compressibility are described, for example, in EP 3394575 B1.

On the basis of the preliminary mode-specific calibration factors $\mathrm{calf}_i'$, the preliminary mode-specific mass flow rate measurement values $\dot{m}_1'$ are calculated 122a, 122b.

By means of the preliminary mode-specific mass flow rate measurement values $\dot{m}_1'$, determining 123a, 123b of the final mode-specific calibration factors follows according to $$\mathrm{calf}_i = \mathrm{calf}'_i K_{j\,Re},$$

wherein the $K_{j\,Re}$ are factors for a mode-specific Reynolds number correction.

Details on the Reynolds number correction are described, for example, in EP 1 055 102 B1.

With the final mode-specific calibration factors $calf_i$ determined in this way, the calculation 124a, 124b of the mode-specific mass flow rate measurement values is finally carried out according to:

$$\dot{m}_i = calf_i \cdot \tau_i + o_i,$$

The method step 120a, 120b is thus complete.

FIG. 4c finally shows a modified embodiment 100' of the method, which allows an update of the mode-specific zero point error $o_i$, provided that information is available about whether the flow is actually zero. This can be ensured, for example, by a status message of a valve if the status "closed" effects an interruption of the flow to be monitored. A query 125 of whether a valve is open is provided after the calculation 120a, 120b of the mass flow rate measurement values. In the positive case, the method continues as previously with the determination 130 of the difference amount between the mass flow rate measurement values. In the negative case, however, the check 126 of whether the mass flow rate measurement values deviate from zero by no more than a tolerance value follows. In the positive case, the method begins again from the beginning. In the negative case, however, the checking is followed by an analysis 127 of the mode-specific zero point errors $o_i$, which correspond to the mass flow rate measurement values, since the latter would currently have to be zero. For example, it is checked whether a mode-specific alarm limit value for the zero point error is exceeded, wherein an error message is output in this case.

Likewise, it is also determined, for example, at which average rate of change the zero point errors have changed since the last secured determination. According to one embodiment of the invention, a prediction can thus be emitted for when a similar change and/or exceeding the mode-specific alarm limit value for the zero point error can be expected under the same process conditions. A message about the expected point in time is output. Finally, the current mode-specific mass flow rate measurement values $\dot{m}_i$ are stored 128 as new mode-specific zero point errors $o_i$ before a new run-through of the method begins.

The invention claimed is:

1. A method for operating a Coriolis mass flowmeter having at least one vibratable measuring tube for conducting a medium, comprising:
   exciting a first symmetrical bending vibration mode of the at least one measuring tube;
   exciting a second symmetrical bending vibration mode of the at least one measuring tube;
   determining a first mass flow rate measurement value on the basis of a first Coriolis deformation of the at least one measuring tube and a first stored mode-specific zero point error value;
   determining a second mass flow rate measurement value on the basis of a second Coriolis deformation of the at least one measuring tube and a second stored mode-specific zero point error value; and
   determining a zero point deviation value of the mass flow rate measurement as a function of a deviation between the first mass flow rate measurement value and the second mass flow rate measurement value.

2. The method of claim 1, further including:
   monitoring the zero point deviation value; and
   signaling an error status if the at least one zero point deviation value exceeds a threshold value.

3. The method of claim 1, further including:
   determining a rate of change of the zero point deviation value and signaling an error status if the rate of change of the zero point deviation value exceeds a threshold value.

4. The method of claim 1, wherein the determination of the first mass flow rate measurement value and the second mass flow rate measurement value in each case includes:
   determining in each case a preliminary mass flow rate measurement value on the basis of the corresponding Coriolis deformation of the at least one measuring tube;
   determining in each case a correction factor for the first and second preliminary mass flow rate measurement values for influencing the mass flowmeter by means of a resonator effect due to a gas loading of the medium conducted in the measuring tube; and
   correcting the two preliminary mass flow rate measurement values with the corresponding mass flow rate correction factor.

5. The method of claim 1, further including:
   checking on the basis of the natural frequencies of a plurality of bending vibration modes whether the mass flowmeter is influenced by a resonator effect due to a gas loading of the medium conducted in the measuring tube;
   wherein in this case the determination of the first mass flow rate measurement value and the second mass flow rate measurement value in each case comprises:
   determining in each case a preliminary mass flow rate measurement value on the basis of the corresponding Coriolis deformation mode of the at least one measuring tube;
   determining in each case a correction factor for the first and second preliminary mass flow rate measurement values for influencing the mass flowmeter by means of a resonator effect due to a gas loading of the medium conducted in the measuring tube; and
   correcting the two preliminary mass flow rate measurement values with the corresponding mass flow rate correction factor.

6. The method according to claim 1, further including:
   wherein the method is carried out in a stationary medium, the method further comprising:
   updating the first zero point error value on the basis of the first mass flow rate measurement value; and
   updating the second zero point error value on the basis of the second mass flow rate measurement value.

7. The method according to claim 1, further comprising:
   correcting the first and second mass flow rate measurement values with regard to the influence of at least one of the following influencing variables, before determining a zero point deviation value: media pressure, media temperature and Reynolds number.

8. A Coriolis mass flowmeter, comprising:
   at least one measuring tube for conducting a medium;
   at least one exciter for exciting bending vibration modes of the at least one measuring tube;
   at least one sensor for detecting bending vibrations of the at least one measuring tube;
   a measuring and operation circuit, which is configured to drive the exciter, to detect signals from the at least one sensor, to determine a mass flow rate measurement value on the basis of the signals from the at least one sensor, and to carry out the following method:

exciting a first symmetrical bending vibration mode of the at least one measuring tube;

exciting a second symmetrical bending vibration mode of the at least one measuring tube;

determining a first mass flow rate measurement value on the basis of a first Coriolis deformation of the at least one measuring tube and a first stored mode-specific zero point error value;

determining a second mass flow rate measurement value on the basis of a second Coriolis deformation of the at least one measuring tube and a second stored mode-specific zero point error value; and determining a zero point deviation value of the mass flow rate measurement as a function of a deviation between the first mass flow rate measurement value and the second mass flow rate measurement value.

* * * * *